(12) United States Patent
Bush, III et al.

(10) Patent No.: US 8,724,141 B2
(45) Date of Patent: May 13, 2014

(54) METHOD FOR RECEIVING A CHANGE-MODE COMMAND WHILE PRINTING ON A PLURALITY OF MEDIA SHEETS

(75) Inventors: James Lesesne Bush, III, Lexington, KY (US); John Thomas Writt, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 706 days.

(21) Appl. No.: 12/500,920

(22) Filed: Jul. 10, 2009

(65) Prior Publication Data

US 2011/0007346 A1 Jan. 13, 2011

(51) Int. Cl.
*G06F 3/12* (2006.01)

(52) U.S. Cl.
USPC ............................. 358/1.15; 358/1.6; 347/19

(58) Field of Classification Search
USPC ................... 358/1.15, 1.2, 1.9, 2.1, 413, 1.13
See application file for complete search history.

(56) References Cited

U.S. PATENT DOCUMENTS

| | | | |
|---|---|---|---|
| 6,538,770 B1* | 3/2003 | Mestha | 358/1.9 |
| 2008/0174793 A1* | 7/2008 | Mutsuno | 358/1.6 |
| 2008/0180716 A1* | 7/2008 | Miyata | 358/1.13 |
| 2009/0058920 A1* | 3/2009 | Endo et al. | 347/19 |
| 2009/0059250 A1* | 3/2009 | Onishi | 358/1.13 |
| 2009/0279136 A1* | 11/2009 | Kanno | 358/1.15 |

* cited by examiner

*Primary Examiner* — Benny Q Tieu
*Assistant Examiner* — Juan M Guillermety
(74) *Attorney, Agent, or Firm* — John Victor Pezdek (57) ABSTRACT

Disclosed is a method for performing printing on a plurality of media sheets in an imaging device. The method includes receiving a change-mode command while printing on a media sheet of the plurality of media sheets. Specifically, the printing is being performed by utilizing a first print mode. Also, the change-mode command comprises a request for changing the first print mode to a second print mode. The method further includes performing printing on subsequent media sheets of the plurality of media sheets by utilizing the second print mode. The imaging device for performing printing on the plurality of media sheets is also described.

15 Claims, 3 Drawing Sheets

METHOD FOR RECEIVING A CHANGE-MODE COMMAND WHILE PRINTING ON A PLURALITY OF MEDIA SHEETS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The disclosure relates generally to a method for performing printing on a plurality of media sheets in imaging devices, such as printers, photocopiers and the like.

2. Description of the Related Art

Imaging devices are commonly used to reproduce a textual and/or a graphical data on media sheets, such as paper sheets, transparencies and the like. Such reproduction of the textual and/or the graphical data on the media sheet is generally referred to as "printing". Typical imaging devices may include inkjet printers, laser printers, photocopiers and the like. Generally, a conventional printer may be communicably coupled to a host device, such as a desktop computer, which acts as a source of the textual and/or the graphical data that is to be printed on the media sheets. A user on the host device may initiate printing on the printer by transmitting an appropriate command from the host device to the printer. In return, the host device converts the textual and/or the graphical data into a binary image data. The host device may transmit the binary image data to the printer for commencing printing on the media sheets. Preferably, the binary image data may be further converted to a format that is readily understood by the printers. The conversion may be carried out by the host device prior to transmission of the binary image data or by the printer upon receipt of the binary image data from the host device. Further, the printer may perform printing of the textual and/or the graphical data on the media sheets by utilizing the binary image data.

Further, the conventional printers generally include a printing unit adapted to perform printing on media sheets. For example, a conventional inkjet printer includes a printing unit having at least one printhead. The at least one printhead may include a plurality of nozzles configured thereon and at least one ink tank having an ink stored therein. Each of the plurality of nozzles may be configured with an activation resistor and a bubble chamber adapted to receive ink therein. The plurality of nozzles may be "fired" by means of activation resistors, such that a corresponding activation resistor of the each nozzle heats the ink in the corresponding bubble chamber of the each nozzle. The ink heats up to form an ink bubble in the bubble chamber. The ink bubble is expelled out of the nozzle on to the media sheet, thereby forming an ink dot on the media sheet. The printing unit activates only the appropriate activation resistors based on the binary image data such that a definite pattern of ink dots is formed on the media sheet for reproducing the textual and/or the graphical data thereon.

Generally, conventional imaging devices may provide a user with various options related to a quality with which a textual and/or a graphical data may be printed on media sheets. Such options related to quality of print may be referred to as "print modes". For example, print modes in a conventional printer may include a "draft print mode", a "normal print mode" and a "rich print mode". Specifically, the "rich print mode" is characterized by a high resolution printing and utilizes more ink/toner as compared to other print modes. The "draft print mode" is an economical print mode and is characterized by a low resolution printing. Accordingly, the "draft print mode" utilizes less amount of ink/toner. The draft print mode may also be characterized as having a reduced print time as compared to the "rich print mode". Usually, a finalized version of a document may be printed by utilizing the "rich print mode" while a preliminary version of the document, such as a review copy thereof, may be printed in the "draft print mode". The user may select an appropriate print mode prior to commencing printing of a document based on the type of the document he/she desires to print.

For the convenience of the user, many conventional imaging devices provide an option of setting a default print mode such that the user is not required to select the print mode every time he/she desires to print a document. For example, the user may set the default print mode as "rich print mode" so that each document is printed with high resolution. However, setting the default print mode may sometimes cause problem to the user. For example, the user may forget to change the default print mode (i.e. the "rich print mode") while printing a document that was preferred to be printed in the "draft print mode". Accordingly, the document may be printed in the "rich print mode", thereby leading to a waste of ink/toner. Also, it may happen that the user may desire to cancel the printing with the default print mode and initiate a fresh printing using the "draft print mode". However, procedure for cancellation of printing in most of the conventional printers is very cumbersome and time-consuming leading to loss of productivity. Moreover, it may happen that before the user cancels the printing, a portion of the document (i.e., a few pages thereof) already is printed in the "rich print mode", thereby causing a waste of ink/toner and media sheets. Accordingly, the conventional techniques of changing the print modes in an imaging device, as described herein, are cumbersome, and are not time-effective or economical.

Based on the foregoing, there is a need for efficiently printing on media sheets in an imaging device in a manner that involves minimal wasting of ink/toner and media sheets associated with changing a print mode of the imaging device. Specifically, there is a need for enabling printing on the media sheets in a manner such that switching between print modes of the imaging device is time-effective and less cumbersome. Moreover, the switching between the print modes of the imaging device may be enabled in a manner that prevents wasting of media sheets and ink/toner.

SUMMARY OF THE DISCLOSURE

In view of the foregoing disadvantages inherent in the prior art, the general purpose of the present disclosure is to provide a method for printing media sheets in an imaging device to include all the advantages of the prior art, and to overcome the drawbacks inherent therein. Specifically, the present disclosure describes a method for printing media sheets in an imaging device such that the method is capable of changing a print mode of the imaging device in a time-effective manner.

Therefore, in one aspect, the present disclosure provides a method for performing printing on a plurality of media sheets in an imaging device. The method is implemented in the imaging device. The method includes receiving a change-mode command while printing on a media sheet of the plurality of media sheets. Specifically, the printing in the imaging device is being performed by utilizing a first print mode. Also, the change-mode command received by the imaging device comprises a request for changing the first print mode to a second print mode. The method further includes performing printing on subsequent media sheets of the plurality of media sheets by utilizing the second print mode.

In another aspect, the present disclosure provides an imaging device for performing printing on a plurality of media sheets. The imaging device includes a printing unit adapted to perform printing on the plurality of media sheets. Further, the imaging device includes a processing unit operatively coupled to the printing unit. Specifically, the processing unit is adapted to receive a change-mode command while the printing unit is performing printing on a media sheet of the plurality of media sheets. More specifically, the printing on the media sheet is being performed by utilizing a first print mode. Further, the change-mode command comprises a request for changing the first print mode to a second print mode. Upon receipt of the change-mode command, the printing unit performs printing on subsequent media sheets of the plurality of media sheets by utilizing the second print mode.

BRIEF DESCRIPTION OF THE DRAWINGS

The above-mentioned and other features and advantages of this present disclosure, and the manner of attaining them, will become more apparent and the present disclosure will be better understood by reference to the following description of embodiments of the disclosure taken in conjunction with the accompanying drawings, wherein.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including" "comprising" or "having" and variations thereof herein is meant to encompass the items listed thereafter and equivalents thereof as well as additional items.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the present disclosure may be implemented in software. As such, it should be noted that a plurality of hardware and software-based devices, as well as a plurality of different structural components may be utilized to implement the present disclosure. Furthermore, and as described in subsequent paragraphs, the specific mechanical configurations illustrated in the drawings are intended to exemplify embodiments of the present disclosure and that other alternative mechanical configurations are possible.

The present disclosure provides a method for performing printing on a plurality of media sheets in an imaging device. The plurality of media sheets will be interchangeably referred to as "media sheets". Specifically, the method described in the present disclosure enables a user to print a document on the media sheets in a less cumbersome and time-effective manner. The term "document" as used herein refers to a graphical and/or textual data prepared by a word processor utility or other utility in a computing device, such as a desktop computer. The document may include a plurality of pages over which the graphical and/or the textual data may be distributed. Moreover, the present invention enables the user to change a print mode of the imaging device while the printing of the document is being performed. Specifically, the user may decide to change the print mode of the imaging device while the imaging device is printing the document on a media sheet. Accordingly, the method of the present invention is adapted to change the print mode of the imaging device in a manner such that unnecessary delays associated with conventional techniques of changing the print mode may be avoided. Additionally, the method of the present invention avoids any waste of ink/toner and the media sheets that may occur in the conventional techniques of changing the print mode of the imaging device. Without limiting the scope of the present disclosure, such method is described in conjunction with FIG. 2.

Further, the term "printing" as utilized herein refers to reproduction of a graphical and/or a textual data on a media sheet by using an imaging device, such as a printer. The term "printing" would also encompass generation of a copy of a document as performed by a photocopier. Further, the term "efficient print" as used herein refers to printing on media sheets in a manner such that there is minimal waste of ink/toner and the media sheets specifically associated with changing print modes of the imaging device.

Figure 1:
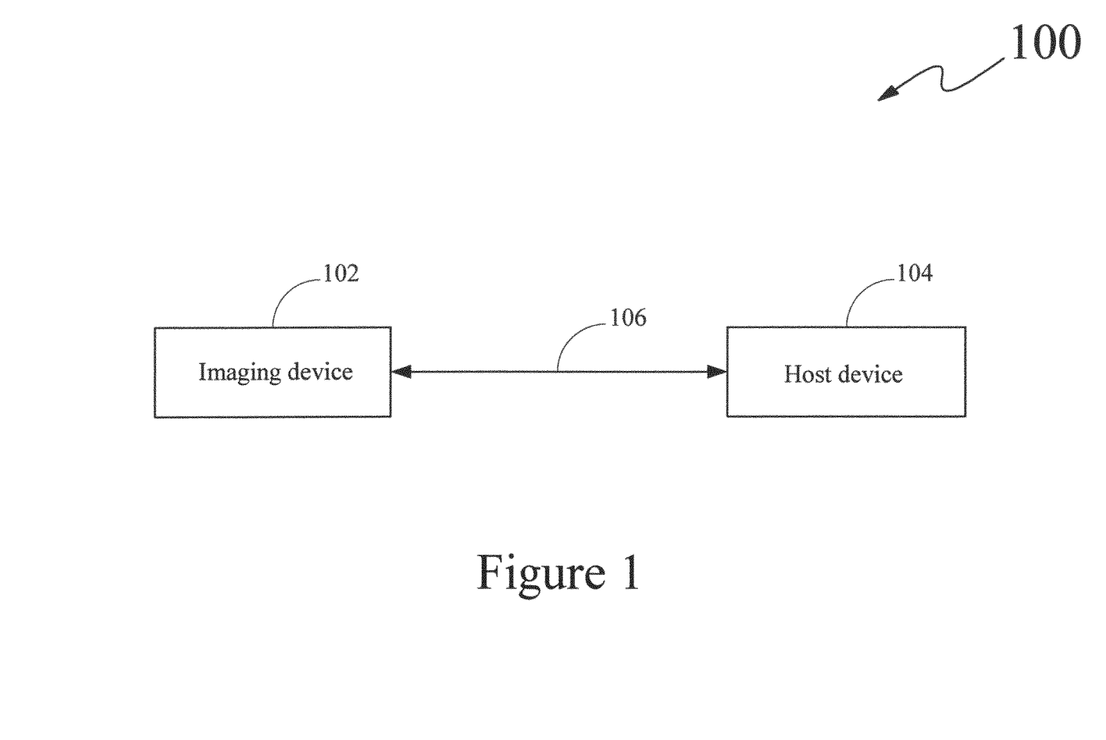
FIG. 1 illustrates an environment in which the present disclosure may be utilized, in accordance with an exemplary embodiment of the present disclosure.

Referring now to FIG. 1, an environment in which the present disclosure may be utilized is illustrated. Specifically, FIG. 1 illustrates a network 100 including an imaging device 102 and at least one host device, such as a host device 104. It will be evident to a person skilled in the art that the imaging device 102 may be communicably coupled to a plurality of host devices, such as in an enterprise network. However, for the explanation of the present disclosure, the communicable coupling between imaging device 102 and only one host device, such as host device 104, will be explained. Further, imaging device 102 may be any conventional imaging device that is capable of printing a document having a textual and/or a graphical data (hereinafter referred to as "content data") on at least one media sheet. Examples of such imaging devices may include, but is not limited to, an inkjet printer, a laser printer, a photocopier and the like. Further, host device 104 may be a computing machine capable of being communicably coupled to imaging device 102. Examples of host device 104 may include, but is not limited to, a notebook computer, a Personal Digital Assistant (PDA), a desktop computer, a server computer and the like.

Host device 104 may be communicably coupled to imaging device 102 over a wired or a wireless link. As shown in FIG. 1, imaging device 102 is communicably coupled to host device 104 over a wired link 106. Imaging device 102 and host device 104 are capable of exchanging information related to printing of the document over wired link 106. Further, host device 104 may be a source of the document. For example, the document may be configured by a word processor utility in host device 104. As explained, for enabling printing of the document by imaging device 102, in an embodiment of the present disclosure, host device 104 may transmit a print command to imaging device 102 over wired link 106. Specifically, host device 104 may convert the content data of the document into a binary image data. The binary image data may be configured in a segmented manner since the content data may be distributed over a plurality of pages of the document.

However, the binary image data may have a format that is not readily understood by imaging device 102 for printing of the content data of the document. Accordingly, host device 104 may convert the binary image data into a "first format data". The first format data may be obtained by conversion of the binary image data based on the fonts and formatting settings of the content data of the document. The first format data may also be segmented similar to the binary image data to correspond to the content data distributed on the plurality of pages of the document. The first format data is further required to be converted to a format that is understandable by a printing unit of imaging device 102. Specifically, imaging device 102 is adapted to print different types of documents, such as spreadsheets, presentations, and the like. Binary image data of such different documents may have various formats. While printing all such different documents by imaging device 102, the various formats are to be converted to a standard format that is understood by imaging device 102. Accordingly, the first format data is converted to a "second format data" that is readily understood by imaging device 102 for printing content data on the media sheets. Specifically, the second format data, similar to the first format data, corresponds to the content data. However, the second format data has a format that is understood by imaging device 102.

For example, in an exemplary embodiment of the present disclosure, the first format data may include the binary image data having Red, Green and Blue (RGB) color stream. Generally, the content data may be prepared and displayed on host device 104 in an RGB color stream. Accordingly, while converting the content data to the binary image data, the binary image data includes the RGB color stream therein. The RGB color stream may be configured corresponding to the fonts and formatting settings of the content data of the document. Further, the second format data may include the binary image data having Cyan, Magenta, Yellow and Black (CMYK) color streams. Specifically, the RGB color stream corresponding to the content data may be converted to equivalent CMYK color streams. However, the conversion is carried out in a manner such that the CMYK color streams correspond to the content data.

The information contained in the first format data and the second format data is not limited to that described herein. It will be evident to a person skilled in the art that the first format data and the second format data may include other information, such as other color streams, formats and the like, that may correspond to the content data of the document and that may be utilized for accurately printing the content data on media sheets.

As explained herein, the conversion from the first format data to the second format data may be performed by host device 104 or imaging device 102, which will be explained in detail in conjunction with FIG. 2. However, the conversion from the first format data to the second format data is performed based on the formatting requirements for a print mode preferred by user. For example, if the user prefers to print the document in the rich print mode, the conversion of the first format data to the second format data is performed in accordance with the formatting requirements for the rich print mode. Further, the second format data may be provided to imaging device 102 to accurately print the content data of the document on the media sheets. Imaging device 102 is capable of printing the content data on the media sheets based on the second format data.

Figure 2:
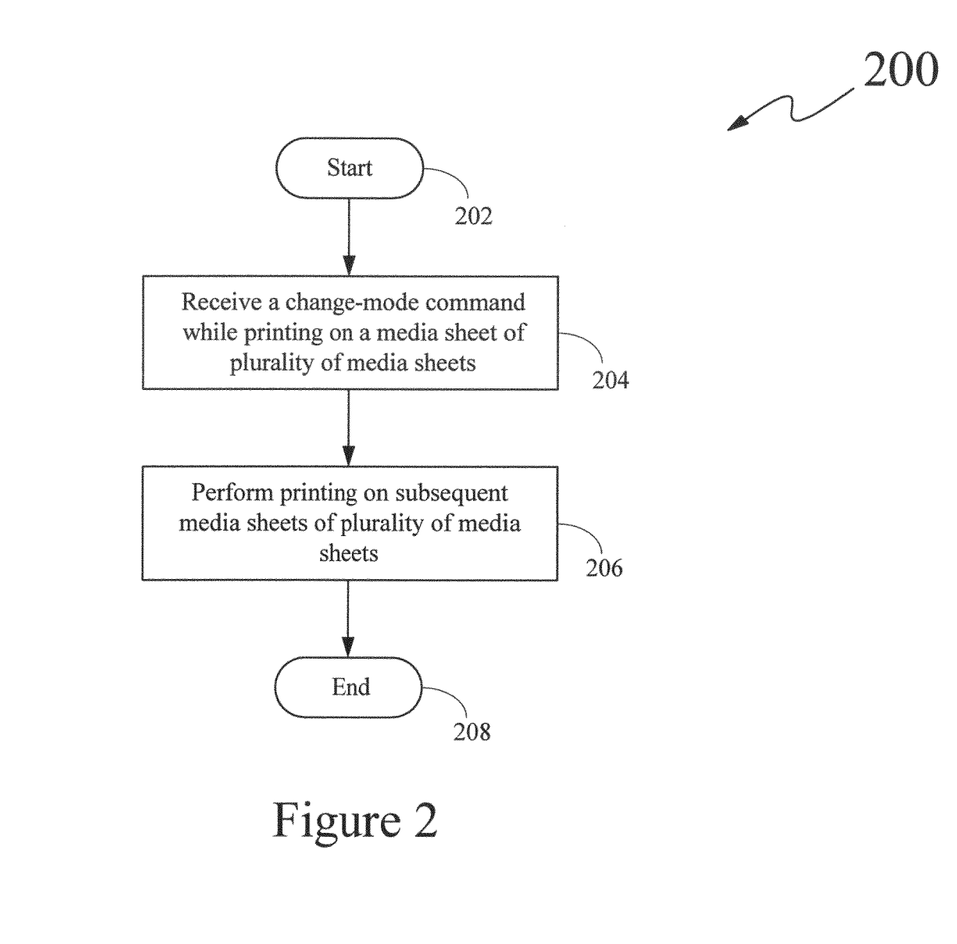
FIG. 2 illustrates a flow diagram of a method for printing on the plurality of media sheets, in accordance with an exemplary embodiment of the present disclosure.

Referring now to FIG. 2, a flow diagram of a method 200 employed in imaging device 102 is illustrated. Method 200 enables imaging device 102 to efficiently perform printing of the content data of the document on the media sheets. Method 200 commences at 202. Specifically at 202, a user on host device 104 initiates printing of the content data by transmitting a print command to imaging device 102. More specifically, the user may utilize a default or a selected print mode, such as a "rich print mode" of imaging device 102 for printing the content data on the media sheets. The default or the selected print mode may be hereinafter referred to as a "first print mode" of imaging device 102. Further, upon initiation of printing of the content data, host device 104 may convert the content data into a corresponding binary image data. As explained in conjunction with FIG. 1, the binary image data may be processed to be converted to the first format data that is further converted to the second format data. The conversion of the binary image data to the second format data will be explained in detail in conjunction with two embodiments of the method 200. Further, as explained, the first format data and the second format data correspond to the content data of the document. Furthermore, the second format data is configured based on the formatting requirements of the first print mode.

The second format data is utilized by imaging device 102 for printing the content data on the media sheets. While imaging device 102 is printing on one of the media sheets (such media sheet will be referred to as "current media sheet"), the user may realize that the first print mode involves high resolution printing which is not time effective. Accordingly, the user may be desirous of changing the first print mode of imaging device 102 to an economical print mode, such as the 'draft print mode'. The economical print mode may be hereinafter referred to as a "second print mode". The second print mode may utilize a low resolution printing and accordingly is time effective as compared to the first print mode. It will be apparent to a person skilled in the art that each of the first print mode and the second print mode are associated with a particular quality of printing being performed on the media sheets. For example, the first print mode is associated with a quality of printing on the current media sheet. Similarly, the second print mode is associated with a quality of printing on the media sheets that are subsequent to the current media sheet, as will be explained later.

Further, to change the first print mode, the user may initiate a change-mode command. Specifically, the change-mode command may include a request for changing the first print mode to the second print mode. In an embodiment of the present disclosure, the user may initiate the change-mode command at host device 104. The change-mode command may be transmitted from host device 104 to imaging device 102 for changing the first print mode thereof. In another embodiment of the present disclosure, the change-mode command may be initiated from a user interface, such as a keyboard, a touch-screen and the like on imaging device 102 for changing the first print mode thereof.

As explained herein, the change-mode command is initiated by the user while imaging device 102 is still printing on the current media sheet based on the first print mode. Referring to FIG. 2, the change-mode command initiated by the user may be received by imaging device 102 at 204. Upon receiving the change-mode command, imaging device 102 continues printing on the current media sheet. Concurrent to the printing on the current media sheet, imaging device 102 performs the necessary operations for changing the first print mode to the second print mode. Such operations will be later described in detail. Also, imaging device 102 may communicate to host device 104 about the receipt of the change-mode command concurrent to the printing on the current media sheet being performed. Along with the communication, imaging device 102 may transmit an "end command" to host device 104. The end command may be an indication to host device 104 to cancel the print command. As explained, the print command was initiated by host device 104 for printing of the content data based on the first print mode. Further, imaging device 102 commences printing on subsequent media sheets by utilizing the second print mode, at 206, after the printing on the current media sheet concludes. Method 200 concludes at 208 after imaging device 102 concludes printing of the content data on the subsequent media sheets based on the second print mode.

As explained herein, method 200 is adapted to enable changing of the first print mode of imaging device 102 in a time-effective manner. Specifically, the first print mode of imaging device 102 is changed concurrent to the printing on the current media sheet. Therefore, method 200 avoids unnecessary time waste associated with changing between the print modes of imaging device 102 as encountered with conventional imaging devices. Moreover, method 200 prevents unnecessary waste of ink/toner and media sheets since method 200 enables the user to change a print mode of imaging device 102 without canceling an ongoing printing. Specifically, when the change mode command is received, a portion of the document is already printed on one or more of the media sheets based the first print mode. Method 200 ensures that a remaining portion of the document is printed on the subsequent media sheets by utilizing the second print mode. Accordingly, method 200 prevents waste of media sheets and ink/toner which would have occurred in a conventional technique of changing the print mode of a conventional imaging device 102.

Further, in an embodiment of the present disclosure, method 200 may further reduce time involved in changing between print modes of imaging device 102 by avoiding regular series of tasks while commencing the printing on the subsequent media sheets. Such series of tasks may be performed every time imaging device 102 commences fresh printing on the media sheets. Examples of the series of tasks include, but are not limited to, verifying printheads of imaging device 102 and preparing the printheads for printing. Further, it may happen that imaging device 102 receives print commands from other host devices in the network 100 while imaging device 102 is preparing to commence printing on the subsequent media sheets with the second print mode. In such a case, method 200 is adapted to temporarily ignore such print commands. Specifically, the print commands are placed in a job queue of imaging device 102 and are processed only when imaging device 102 commences printing on the subsequent media sheets.

Method 200 will now be explained in conjunction with a first embodiment of the present disclosure. A reference to FIG. 2 will be made for a detailed explanation of the first embodiment. Specifically, in the first embodiment, the user may initiate printing of the content data at 202 by selecting the first print mode of imaging device 102. As explained earlier, the content data may reside on host device 104. Upon initiation of printing of the content data, host device 104 may convert the content data into the binary image data such that the binary image data corresponds to the content data. The binary image data may be segmented to correspond to distribution of the content data on the plurality of pages of the document. Further, the binary image data is converted to the first format data by host device 104 based on the fonts and formatting settings of the content data. However, the first format data may not be readily understood by imaging device 102. Accordingly, in the described embodiment, host device 104 converts the first format data into the second format data. Specifically, the first format data is converted to the second format data based on the formatting requirements of the first print mode, which is the print mode preferred by the user while initiating printing of the content data.

As explained, the second format data corresponds to the content data. Also, it will be evident to a person skilled in the art that the first format data and the second format data may retain the segmentation of the binary image data to correspond to distribution of the content data on the plurality of pages of the document. Further, the second format data may be transmitted by host device 104 to imaging device 102 for enabling printing of the content data on the media sheets. Upon receiving the second format data, imaging device 102 may commence printing on the media sheets. Specifically, imaging device 102 performs printing of the content data on the media sheets based on the first print mode since the second format data is configured based on the first print mode.

As explained herein, the user may initiate the change-mode command to change the first print mode to the second print mode while imaging device 102 is printing on one of the media sheets, i.e. the current media sheet. Concurrent to printing being performed on the current media sheet, the change-mode command is received by imaging device 102 at 204. As explained earlier, the change-mode command includes a request for changing the first print mode to the second print mode. It will be evident to a person skilled in the art that imaging device 102 may have printed a portion of the content data at the instant the change-mode command is received. The printed portion of the content data may be determined based on a "current page" of the plurality of pages of the document that was being printed by imaging device 102 when the change-mode command was initiated by the user. The current page may be represented by a page number referred to as a "current page number".

Information regarding the current page number may be transmitted by imaging device 102 to host device 104 in the form of an acknowledgement message. Specifically, imaging device 102 may transmit the current page number to host device 104 to indicate the portion of the content data that has been printed. Based on the received current page number, host device 104 may determine a remnant portion of the content data that is still to be printed. Specifically, the remnant portion of the content data is a remaining portion of the content data that was unprinted when the change-mode command was initiated by the user. It will be evident to a person skilled in the art that the remnant portion (hereinafter referred to as "remnant data") of the content data is represented by pages of the document that are subsequent to the current page number. Further, the determination of the remnant data is performed concurrent to printing on the current media sheet being performed by imaging device 102.

Furthermore, upon determination of remnant data, host device 104 may transmit a "host data" to imaging device 102. Specifically, the host data may correspond to the remnant data. More specifically, upon determination of the remnant data, host device 104 converts the remnant data into an equivalent binary image data (hereinafter referred to as "remnant binary image data") thereof. Thereafter, host device may convert the remnant binary image data into a "remnant first format data" based on the fonts and formatting settings of the remnant data.

In an embodiment, host device 102 may directly determine the remnant first format data based upon determination of the remnant portion of the content data. Specifically, since the first format data corresponds to the content data, the remnant first format data may be easily determined from the first format data by subtracting the printed portion of the content data therefrom. The remnant first format data corresponds to the remnant data.

However, the remnant first format data may not be understandable by imaging device 102. Accordingly, host device 104 may convert the remnant first format data to a "remnant second format data" that is readily understood by imaging device 102. The remnant second format data corresponds to the remnant data. Specifically, the remnant second format data may be readily understood by imaging device for enabling printing of remnant data on the media sheets that are subsequent (hereinafter referred to as "subsequent media sheets") to the current media sheet. Furthermore, the remnant second format data may be configured based on the second print mode of imaging device 102. Specifically, the remnant second format data may be configured based on formatting requirements of the second print mode. As explained herein, the second print mode is an economical print mode that utilizes lesser amount of ink/toner as compared to other print modes of imaging device 102. Accordingly, the second print mode is characterized by a particular amount of half-toning which enables less utilization of ink/toner. The conversion of the remnant first format data into the remnant second format data, in accordance with the described embodiment, utilizes the particular amount of half-toning that is characteristic to the second print mode.

Host device 104 configures the host data by including the remnant second format data. Further, the host data is transmitted by host device 104 to imaging device 102 for enabling printing of the remnant data based on the second print mode. The generation of the host data at host device 104 and transmission of the host data to imaging device 102 may occur concurrent to the printing being performed on the current media sheet. Imaging device 102 receives the host data and waits until the printing on the current media sheet concludes. Thereafter, imaging device 102 commences printing on the subsequent media sheet upon conclusion of printing on the current media sheet. Specifically, at 206, imaging device 102 performs printing on the subsequent media sheets based on the host data received from host device 104. More specifically, the printing on the subsequent media sheets is performed based on the second print mode. It will be evident to a person skilled in the art that the second print mode may be associated with a quality of printing on the subsequent media sheets. Further, method 200 terminates at 208 when the printing of the remnant data on the subsequent media sheets concludes.

As explained herein, the changing of the print mode, in accordance with the described embodiment, occurs concurrent to the printing being performed on the current media sheet. Accordingly, the described embodiment does not involve time waste associated with cancellation of printing as in a conventional technique for changing the print mode. Moreover, the changing of the print mode, as described herein, avoids unwanted waste of media sheets and ink/toner that usually occurs in conventional techniques of changing the print mode.

Method 200 will now be explained in conjunction with a second embodiment of the present disclosure. However, a reference to FIG. 2 will be made for a detailed explanation of the second embodiment. In the second embodiment, the user may initiate printing of the content data of the document at 202 by selecting the first print mode of imaging device 102. As explained earlier, the content data may reside on host device 104. Upon initiation of printing of the content data by the user, host device 104 may convert the content data into the binary image data. The binary image data may be segmented to correspond to distribution of the content data on the plurality of pages of the document. The binary image data is further converted to the first format data by host device 104 based on the fonts and formatting settings of the content data. Also, it will be evident to a person skilled in the art that the first format data may retain the segmentation of the binary image data. The first format data is transmitted by host device 104 to imaging device 102 for enabling printing of the content data on the media sheets. However, the first format data may not be readily understood by imaging device 102. Accordingly, in the described embodiment, imaging device 102 is adapted to convert the received first format data to the second format data. Specifically, the first format data is converted to the second format data based on the formatting requirements of the first print mode, which is the print mode preferred by the user while initiating printing of the content data. As explained, the second format data corresponds to the content data. Also, it will be evident to a person skilled in the art that the second format data may retain the segmentation of the binary image data. Further, the second format data may be utilized by imaging device 102 for performing printing of the content data on the media sheets. Specifically, imaging device 102 may perform printing of the content data on the media sheets based on the first print mode since the second format data is configured based on the first print mode.

As explained herein, the user may initiate the change-mode command to change the first print mode to the second print mode while imaging device 102 is printing on one of the media sheets, i.e. the current media sheet. Concurrent to the printing being performed on the current media sheet, the change-mode command is received by imaging device 102 at 204. Upon receiving the change-mode command, imaging device 102 determines the remnant data that is still to be printed. Specifically, in the described embodiment, imaging device 102 determines a portion of the second format data that has been printed on the media sheets when the change-mode command was received. Thereafter, a printed portion of the first format data corresponding to the printed portion of the second format data is determined. In an embodiment, imaging device 102 may maintain a database of the first format data from which the second format data has been obtained by conversion. The database may include mapping of various portions of the first format data onto various portions of the second format data. Imaging device 102 may compare the printed portion of the second format data with the second format data in the database to obtain a corresponding portion of the first format data. The corresponding portion of the first format data represents the printed portion of the first format data.

Further, the portion of the first format data is utilized to determine a remaining portion of the first format data that remained unprinted when the change-mode command was received. The remaining portion of the first format data corresponds to a remaining portion of the content data (i.e. the "remnant data") since the first format data corresponds to the content data. Further, the determination of the remaining portion of the first format data is performed concurrent to printing being performed on the current media sheet.

Upon determining the remaining portion of the first format data, imaging device 102 determines a "device data". More specifically, imaging device 102 converts the determined remaining portion of the first format data into a "remnant second format data" such that the remnant second format data has a format that is readily understood by imaging device 102. The remnant second format data corresponds to the remnant data. Specifically, the remnant second format data may be readily understood by imaging device 102 for enabling printing of remnant data on the media sheets that are subsequent (hereinafter referred to as "subsequent media sheets") to the current media sheet. Accordingly, the device data may include the second format data that corresponds to the remnant data. Furthermore, the remnant second format data may be configured based on the formatting requirements of the second print mode of imaging device 102. As explained in conjunction with the first embodiment, the second print mode is an economical print mode. Accordingly, the second print mode is characterized by a particular amount of half-toning which enables less utilization of ink/toner. Particularly, the conversion into the remnant second format data, in accordance with the described embodiment, utilizes the particular amount of half-toning that is characteristic to the second print mode.

After determining the device data, imaging device 102 waits until the printing on the current media sheet concludes. Upon conclusion of the printing on the current media sheet, imaging device 102 commences printing on the subsequent media sheets based on the determined device data. Specifically, at 206 (in FIG. 2), imaging device 102 performs printing on the subsequent media sheets based on the device data. More specifically, imaging device 102 performs printing of the remnant data on the subsequent media sheets based on the second print mode. Method 200 terminates at 208 when the printing of the remnant data on the subsequent media sheets concludes. As explained herein, the changing of the print mode, in accordance with the described embodiment, occurs concurrent to the printing being performed on the current media sheet. Accordingly, the described embodiment does not involve the waste of time associated with cancellation of printing and change of print mode as in a conventional technique. Moreover, the changing of the print mode, as described herein, avoids unwanted waste of the media sheets and ink/toner that usually occurs in conventional techniques of changing the print mode.

Figure 3:
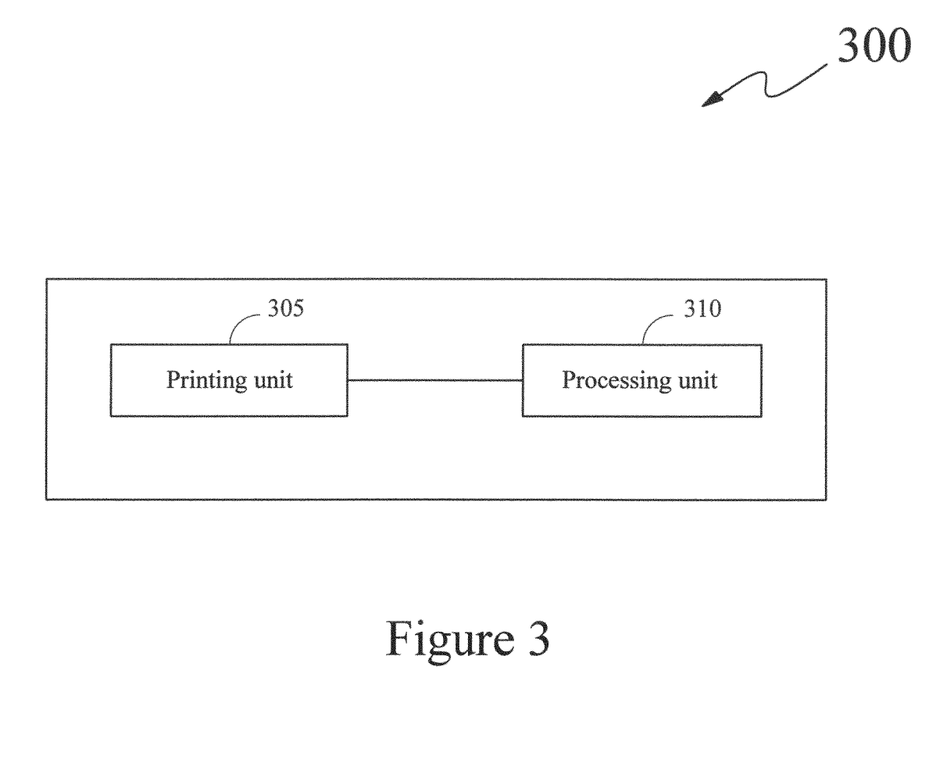
FIG. 3 illustrates a block diagram of an imaging device in which the method of FIG. 2 is incorporated.

Referring now to FIG. 3, an imaging device, such as an imaging device 300 that incorporates method 200 therein is explained. Specifically, FIG. 3 illustrates a block diagram of imaging device 300 that is capable of efficiently printing on media sheets in a manner that avoids the waste of ink/toner and the media sheets associated with changing of print modes. Imaging device 300 may be similar to imaging device 102 such that imaging device 300 has various print modes associated therewith. Imaging device 300 may be an inkjet printer, a laser printer, a photocopier and the like. Further, imaging device 300 may be adapted to be communicably coupled to a host device (not shown), such as host device 104. As shown in FIG. 3, imaging device 300 includes a printing unit 305 and a processing unit 310 operatively coupled to printing unit 305. Printing unit 305 is adapted to perform printing on media sheets. In an embodiment of the present disclosure, the imaging device 300 may be an inkjet printer such that printing unit 305 includes at least one printhead having a plurality of nozzles and activation resistors for performing printing on the media sheets. In another embodiment of the present invention, imaging device 300 may be a photocopier such that printing unit 305 includes a laser scanner assembly and a photoreceptor drum.

As explained herein, printing unit 305 is communicably coupled to processing unit 310. Further, processing unit 310 is adapted to receive a print command from the host device for initiating printing of a content data of a document based on the first print mode. The host device converts the content data into a corresponding binary image data. Further, the binary image data may be converted to the first format data that is converted to the second format data. Further, the second format data may be converted from the first format data based on the formatting requirements for the first print mode. Particularly, the first format data and the second format data correspond to the content data of the document. Further, the host device may be adapted to transmit one of the first format data and the second format data along with the print command to imaging device 300. Upon receiving the print command, processing unit 310 may direct the one of the received first format data and the received second format data to printing unit 305 to perform printing of the content data based on the first print mode.

Moreover, processing unit 310 may be adapted to receive a change-mode command for changing print mode of imaging device 300. As explained earlier, the change-mode command may be initiated by a user at the host device, such as host device 104, or at imaging device 300 by using a user interface thereof. Specifically, the change-mode command may be received by processing unit 310 while printing unit 305 is performing printing on one of the media sheets, i.e. the current media sheet, based on the first print mode.

Further, upon receiving the change-mode command, processing unit 310 performs necessary operations required to change the first print mode to the second print mode, which have been explained in conjunction with method 200. As explained herein, such operations are performed by processing unit 310 concurrent to printing being performed by printing unit 305 on the current media sheet. After commencing printing on the current media sheet, printing unit 305 performs printing on the subsequent media sheets based on the second print mode. Processing unit 310 and the operations performed by the processing unit 310 for changing the first print mode will now be further explained in conjunction with two embodiments of the present disclosure.

In an embodiment of the present disclosure, imaging device 300 incorporates the first embodiment of method 200 therein. In the described embodiment, a user may initiate printing of the content data by selecting the first print mode of the imaging device 300. As explained herein, the content data may reside on the host device. Upon initiation of printing by the user, the host device may convert the content data into the binary image data that corresponds to the content data. Further, the binary image data is converted to the first format data by the host device based on the fonts and formatting settings of the content data. Thereafter, the host device converts the first format data into the second format data since the first format data is not readily understood by printing unit 305 of imaging device 300. Specifically, the first format data is converted to the second format data based on the formatting requirements of the first print mode, which is the print mode preferred by the user while initiating printing of the content data. Further, the second format data may be transmitted by the host device to imaging device 300 for enabling printing of the content data on the media sheets. As explained herein, the first format data and the second format data correspond to the content data. Further, the transmitted second format data is received by the processing unit 310 of imaging device 300, which in turn transmits the second format data to printing unit 305. Upon receiving the second format data, printing unit 305 may commence printing on the media sheets based on the first print mode.

As explained herein, the user may initiate the change-mode command to change the first print mode to the second print mode while imaging device 300 is printing on the current media sheet. Concurrent to the printing on the current media sheet, the change-mode command is received by processing unit 310 of imaging device 300. Upon receiving the change-mode command, processing unit 310 determines the current page number to determine the printed portion of the content data that has been printed until the change-mode command was received (as explained in conjunction with the first embodiment of method 200). The determination of the current page number is performed concurrent to printing on the current media sheet by printing unit 305.

Further, information regarding the current page number may be transmitted by processing unit 310 to the host device in the form of an acknowledgement message. In return, the host device may transmit the host data to processing unit 310. As explained in conjunction with the first embodiment of method 200, the host data includes the remnant second format data that corresponds to the remnant data. Specifically, the remnant second format data is configured based on formatting requirements of the second print mode.

Further, the host data is transmitted by the host device to imaging device 300. Processing unit 310 of imaging device 300 is adapted to receive the host data. Further, processing unit 310 is adapted to wait until printing unit 305 concludes the printing on the current media sheet. Thereafter, processing unit 310 transmits the host data to printing unit 305 such that printing unit 305 commences printing on the subsequent media sheets based on the host data upon conclusion of printing on the current media sheet. Specifically, printing unit 305 performs printing on the subsequent media sheets based on the second print mode.

In the described embodiment, the acts of determination of the current page number, and determination and transmission of host data are performed concurrent to the printing being performed on the current media sheet. Accordingly, in the described embodiment, imaging device 300 enables changing the print mode in a time-effective manner. Moreover, imaging device 300, as described herein, avoids unnecessary waste of ink/toner and media sheets associated with changing of print mode as in a conventional imaging device.

In accordance with another embodiment of the present disclosure, imaging device 300 incorporates the second embodiment of method 200 therein. In the described embodiment, a user may initiate printing of the content data by selecting the first print mode of imaging device 300. As explained, the content data may reside on the host device. Upon initiation of printing of the content data by the user, the host device may convert the content data into the binary image data. Specifically, the binary image data corresponds to the content data. The binary image data may be segmented to correspond to the plurality of pages of the document. Further, the binary image data is converted to the first format data by the host device based on the fonts and formatting settings of the content data. Also, it will be evident to a person skilled in the art that the first format data may retain the segmentation of the binary image data to correspond to the plurality of pages of the document. Further, the first format data is transmitted by the host device to imaging device 300 for enabling printing of the content data on the media sheets. However, the first format data may be in a format that is not readily understood by imaging device 300.

The transmitted first format data is received by processing unit 310 of imaging device 300. Processing unit 310 is adapted to convert the received first format data to the second format data. Specifically, the first format data is converted to the second format data based on the formatting requirements of the first print mode, which is the print mode preferred by the user while initiating printing of the content data. As explained, the second format data corresponds to the content data. Also, it will be evident to a person skilled in the art that the second format data may retain the segmentation of the binary image data. Further, the second format data may be transmitted by processing unit 310 to printing unit 305 for performing printing of the content data on the media sheets. Specifically, imaging device 102 may perform printing of the content data on the media sheets based on the first print mode since the second format data is configured based on the first print mode.

As explained herein, the user may initiate the change-mode command to change the first print mode to the second print mode while printing unit 305 is printing on the current media sheet. Concurrent to the printing being performed on the current media sheet, the change-mode command is received by processing unit 310 of imaging device 300. Upon receiving the change-mode command, processing unit 310 determines the remnant data that is still to be printed. Specifically, processing unit 310 determines a remaining portion of the first format data that remained unprinted when the change-mode command was received (as explained in conjunction with the second embodiment of method 200). The remaining portion of the first format data corresponds to the remnant data. Processing unit 310 performs the determination of the remnant data concurrent to the printing being performed by printing unit 305 on the current media sheet.

Upon determining the remnant data, processing unit 310 determines the device data. More specifically, processing unit 310 converts the determined remaining portion of the first format data into a "remnant second format data" such that the remnant second format data has a format that is readily understood by printing unit 305. The remnant second format data corresponds to the remnant data. Specifically, the remnant second format data may be readily understood by printing unit 305 for enabling printing of remnant data on the subsequent media sheets. Further, the remnant second format data may be configured based on the formatting requirements of the second print mode of imaging device 300.

After determining the device data, processing unit 310 waits until printing unit 305 concludes printing on the current media sheet. Upon conclusion of printing on the current media sheet, processing unit 310 transmits the device data to printing unit 305. Thereafter, printing unit 305 commences printing on the subsequent media sheets based on the device data. As explained earlier, the device data is configured based on the second print mode. Accordingly, printing unit 305 performs printing on the subsequent media sheets based on the second print mode.

In the described embodiment, the acts of determining the remaining portion of the first format data and determination of the device data are performed concurrent to printing being performed on the current media sheet. Accordingly, imaging device 300 avoids time waste associated with cancellation of printing as in a conventional technique for changing the print mode. Moreover, the changing of the print mode, as described herein, avoids unwanted waste of media sheets and ink/toner that usually occurs in conventional techniques of changing the print mode.

The method for printing media sheet and the imaging device, as described herein, efficiently enable printing of a content data of a document on media sheets. Specifically, the method avoids any waste of ink/toner and media sheets associated with changing of print modes of the imaging device while the imaging device is printing the document. Moreover, the method enables a user to swiftly change the print mode in a less cumbersome and a time-effective manner. Additionally, the method, as described herein, may be implemented on a photocopier device in a manner similar to described for the imaging device, such as imaging devices 102 and 300.

The foregoing description of several methods and an embodiment of the present disclosure have been presented for purposes of illustration. It is not intended to be exhaustive or to limit the present disclosure to the precise steps and or forms disclosed, and obviously many modifications and variations are possible in light of the above description. It is intended that the scope of the present disclosure be defined by the claims appended hereto.

What is claimed is:

1. A method for performing printing on a plurality of media sheets of a document in an imaging device, the method comprising: receiving a change-mode command while printing on a current media sheet of the document by utilizing a first print mode, wherein the change-mode command comprises a request for changing the first print mode to a second print mode; concurrently with completing printing of the current media sheet of the document utilizing the first print mode, changing the printing for subsequent media sheets in the document from the first print mode to the second print mode; and communicating to a host device about the receipt of the change-mode command prior to performing printing on the subsequent media sheets in the second print mode, the host device communicably coupled to the imaging device; receiving a host data from the host device upon communicating about the receipt of the change-mode command to the host device, wherein the host data is associated with the second print mode of the subsequent media sheets; and completing printing of the document by utilizing the received host data for performing the printing on the subsequent media sheets of the document in the second print mode.

2. The method of claim 1 further comprising:
determining a device data upon receiving the change-mode command, wherein the device data is associated with the second print mode of the subsequent media sheets; and
utilizing the device data for performing the printing on the subsequent media sheets.

3. The method of claim 1, wherein the change-mode command is received from a user interface on the imaging device.

4. The method of claim 1, wherein the first print mode is associated with a quality of printing on the media sheets and the second print mode is associated with a quality of printing on the subsequent media sheets.

5. The method of claim 1, wherein the second print mode is associated with a reduced print time when compared with the first print mode.

6. The method of claim 1, wherein printing on the plurality of media sheets is part of a copy function.

7. An imaging device for performing printing on a plurality of media sheets of a document the imaging device comprising: a printing unit for performing the printing, of the document on the plurality of media sheets; and a processing unit operatively coupled to the printing unit, wherein the processing unit receives a change-mode command while the printing unit performs printing on a current media sheet of the document, the printing being performed by utilizing a first print mode, wherein the change-mode command comprises a request for changing the first print mode to a second print mode, wherein the processing unit changes the mode of printing the document from the first print mode to the second print mode concurrent to the printing being performed on the current media sheet of the document utilizing the first print mode, and wherein the processing unit receives a host data from a host device after the receipt of the change-mode command being communicated to the host device, wherein the host device is communicably coupled to the imaging device, and wherein the host data is associated with the second print mode of the subsequent media sheets, and wherein the printing unit completes printing of the document by printing on subsequent media sheets of the document by utilizing the second print mode.

8. The imaging device of claim 7, wherein the printing unit utilizes the host data to perform printing on the subsequent media sheets.

9. The imaging device of claim 7, wherein the change-mode command is received from a host device communicably coupled to the imaging device.

10. The imaging device of claim 7, wherein the processing unit is adapted to determine a device data upon the change-mode command being received, wherein the device data is associated with the second print mode of the subsequent media sheets.

11. The imaging device of claim 10, wherein the printing unit utilizes the device data to perform the printing on the subsequent media sheets.

12. The imaging device of claim 7, wherein the change-mode command is received from a user interface on the imaging device.

13. The imaging device of claim 7, wherein the first print mode is associated with a quality of printing on the media sheet, and the second print mode is associated with a quality of printing on the subsequent media sheets.

14. The imaging device of claim 7, wherein the second print mode is associated with a reduced print time when compared with the first print mode.

15. The imaging device of claim 7, wherein the printing on the plurality of media sheets is part of a copy function.

* * * * *